United States Patent [19]
Parrish

[11] 3,921,743
[45] Nov. 25, 1975

[54] VEHICLE TRACTION UNITS

[75] Inventor: Jack N. Parrish, North Vancouver, Canada

[73] Assignee: Demac Engineering Ltd., Vancouver, Canada

[22] Filed: Feb. 4, 1974

[21] Appl. No.: 438,996

[52] U.S. Cl. ............................ 180/9.2 C; 180/6.7
[51] Int. Cl.² ........................................ B62D 55/04
[58] Field of Search ............. 180/9.2 R, 9.2 C, 5 A, 180/6.7; 305/29, 35 EB

[56] References Cited
UNITED STATES PATENTS

| | | | |
|---|---|---|---|
| 2,041,599 | 5/1936 | Fergusson | 180/6.7 |
| 3,163,249 | 12/1964 | Ledohowski | 180/9.2 R |
| 3,207,562 | 9/1965 | Ewing | 180/9.2 R |
| 3,651,879 | 3/1972 | Wilson | 180/9.2 R |
| 3,710,886 | 1/1973 | Wagner | 180/9.2 R |
| 3,737,001 | 6/1973 | Rasenberger | 180/9.2 R |

*Primary Examiner*—Philip Goodman
*Assistant Examiner*—John A. Carroll
*Attorney, Agent, or Firm*—Fetherstonhaugh & Co.

[57] ABSTRACT

A traction unit having a frame for rigid attachment to the underside of the chassis of a standard truck in place of the rear wheels or all of the wheels and including means for mounting the axle assembly of the truck thereon. The unit includes tracks for engagement around load bearing wheels journalled to the frame, and track drive sprocket wheels for connection to the axle assembly. The arrangement differs from earlier constructions which were not concerned with trucks and were not provided with a frame for rigid connection to a truck body in lieu of the wheels.

10 Claims, 8 Drawing Figures

 
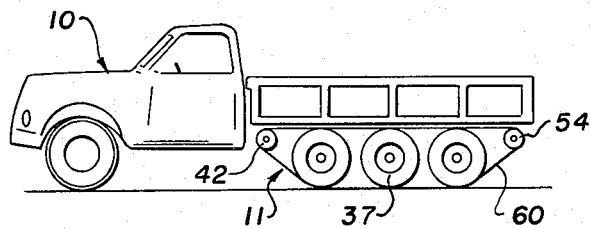 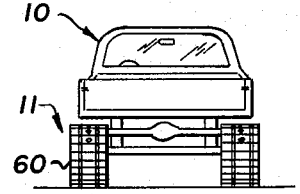
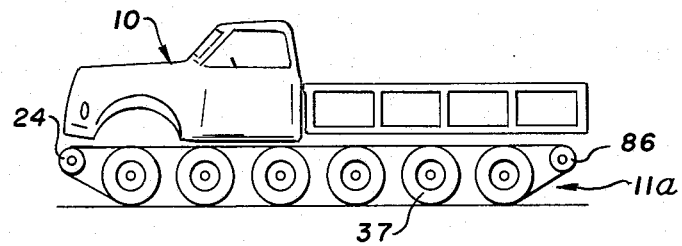
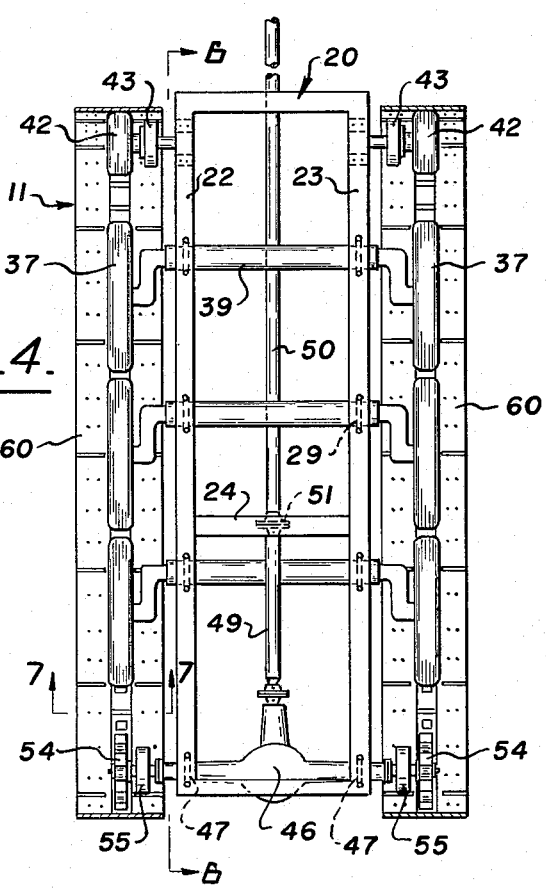

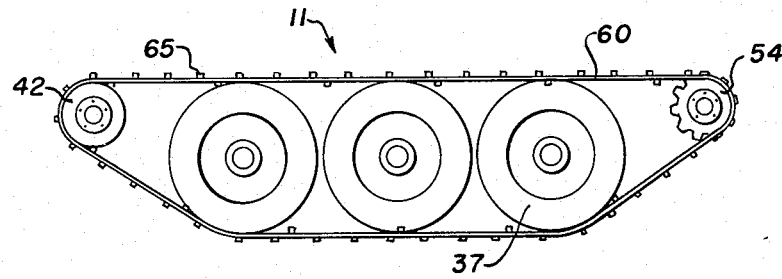
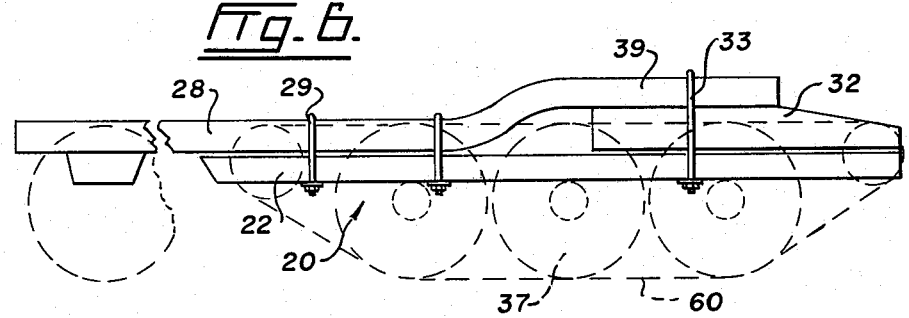
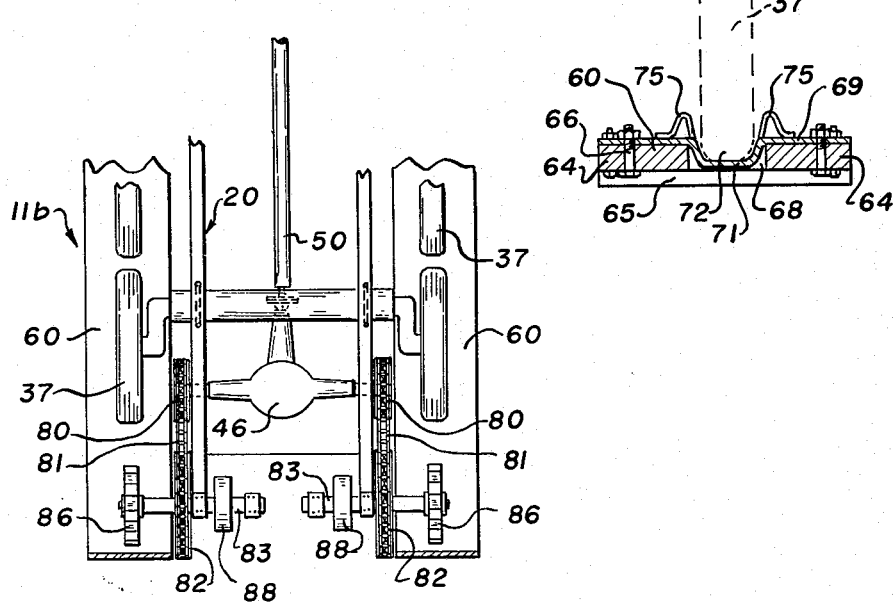

VEHICLE TRACTION UNITS

This invention relates to tracked vehicles or conversion units that can be applied to standard motor vehicles to convert the latter into half-track or full-track vehicles.

There are many half-track and full-track vehicles on the market which can travel over difficult terrain, snow and the like. However, these vehicles and the power and control components thereof are completely constructed for the purpose and, therefore, are extremely expensive. The demand for this type of vehicle is not great enough to enable them to be mass produced in the same manner as trucks. In addition, the vehicles cannot be used for other than the purposes for which they are designed since they either cannot travel on good roads, are too slow, or wear out too fast when used on highways as normal carrying vehicles such as trucks.

There is a very large demand for trucks and so they are mass produced and can be sold for reasonable prices relevant to the jobs they are intended to do. The trucks have powerful engines, transmissions, drives, steering and other useful components, which are produced in large quantities. It is the main purpose of this invention to make it possible to utilize the mass-produced trucks as tracked vehicles. Another purpose is to make it possible to quickly, easily and inexpensively convert a truck to either a half-track or whole-track vehicle unit so that the owner can operate his truck in the normal manner when desired, and can convert it to a tracked vehicle when necessary.

The tracked vehicle unit according to the present invention is a track unit that can be secured to the frame of a truck after the rear wheels of the latter have been removed if a half-track vehicle is required, or after all of the wheels have been removed if a full-track vehicle is the necessity. The vehicle unit is designed either for half-track use or for full-track use. With this arrangement, the engine, transmission and other components of the truck are not disturbed, it only being necessary to remove the rear end assembly. This assembly can be used in the drive system of the track unit. In addition, the truck can be restored for normal usage, if desired.

The invention contemplates the track unit itself, and a vehicle combined with the track unit.

A tracked vehicle unit according to this invention comprises a frame unit adapted to be secured to the frame of a standard motor vehicle, axle means mounted on the frame unit, load-carrying wheels on said axle means at opposite sides of the frame unit, endless track belts extending around said wheels at said opposite frame unit sides, and drive means for said track belts adapted to be drivingly connected to the motor of said vehicle, whereby when the frame and said drive means are connected to the standard motor vehicle, said vehicle can be operated under conditions requiring tracks.

An alternative tracked vehicle unit according to this invention comprises a standard motor vehicle with at least the rear wheels thereof removed, a frame unit secured to the frame of said vehicle, axle means mounted on the frame unit, load-carrying wheels on said axle means at opposite sides of the frame unit, endless track belts extending around said wheels at said opposite frame unit sides, and drive means for said track belts drivingly connected to the motor of said vehicle, whereby said standard motor vehicle can be operated under conditions requiring tracks.

Examples of this invention are illustrated in the accompanying drawings, in which, FIG. 1 is an illustrative side elevation of a standard motor vehicle converted to a half-track vehicle in accordance with this invention, FIG. 2 is an illustrative end view of the converted standard vehicle, FIG. 3 is an illustrative side elevation of a standard motor vehicle converted to a whole-track vehicle in accordance with this invention, FIG. 4 is a plan view of a conversion unit vehicle according to this invention, with the top portions of the track belts thereof broken away, FIG. 5 is a side elevation of the unit vehicle of FIG. 4, FIG. 6 is a longitudinal section taken on the line 6—6 of FIG. 4, showing the frame unit thereof secured to the frame of a standard motor vehicle, FIG. 7 is an enlarged cross-section through a track belt and taken on the line 7—7 of FIG. 4, and FIG. 8 is a fragmentary view similar to FIG. 4, showing an alternative form of drive means for the track belts.

Referring to FIGS. 1 and 2 of the drawings, 10 is a standard vehicle, such as a truck, having the rear wheels thereof removed, and a tracked vehicle or conversion unit 11 substituted thereof. The unit 11 is of such length as to convert the truck to a half-track vehicle unit.

FIG. 3 diagrammatically illustrates truck 11 converted to a full-track vehicle by a track vehicle or conversion unit 11a. The front and back wheels of the truck have been removed, and unit 11a substituted therefore. The main difference between units 11 and 11a resides in the lengths thereof. In view of this, and for the sake of convenience, conversion unit 11 only will be described herein in detail. However, it is to be understood that this invention includes the half-track and full-track conversion units and the resulting tracked vehicles.

The tracked vehicle or conversion unit 11 is illustrated in detail in FIGS. 4 to 7. Conversion unit 11 includes a suitable frame 20 having parallel side members 22 and 23 interconnected by a plurality of cross members 24. Frame unit 20 is adapted to be secured to the frame of the standard motor vehicle in any desired manner. One way of doing this is illustrated in FIG. 6. The frame 28 of the truck is shown alone in FIG. 6, and unit frame 20 is secured thereto in any convenient manner, such as by U-bolts 29. These bolts connect side members 22 and 23 of unit frame 20 to corresponding side members of the truck frame 28. When the truck frame has a raised portion at the rear, as illustrated at 30, unit frame 20 can be shaped to correspond to this or, as preferred, a suitable shaped pad 32 can be inserted between the sides of unit frame 20 and the sides of the raised portion of truck frame 28. The pads 32 are fixedly secured to frame 20, and U-bolts 33 clamp the unit frame and the pads to the raised portion of the truck frame.

Suitable axle means are provided on frame unit 20 for a plurality of load-carrying wheels 37 on opposite sides of said unit. In this example, a plurality of axles 39 are suitably mounted on unit frame 20, and wheels 37 are mounted on these axles. Any suitable axle and spring arrangements can be used. These can be crank axles with coil springs (not shown), solid or tubular axles, or axles with torsion bar springs. A pair of idler wheels 42 are mounted on the forward end of frame 20 and preferably are adjustable longitudinally of the frame. If desired, brakes 43 may be provided for these idler wheels.

Drive means is provided for conversion unit 11. In this example, the rear end assembly 46 of truck 10 is included in the drive means. After being removed from the truck, this rear end assembly is mounted on unit frame 20 near the rear end thereof in any suitable manner, such as by means of U-bolts 47. An extension drive shaft 49 operatively connects the rear end assembly to the drive shaft 50 of the truck through a coupler 51.

The wheels of rear end assembly 46 are replaced by a pair of sprockets 54 which are aligned with the pairs of wheels 37 and the pair of idler wheels 42. The brakes 55 of the rear end assembly are used for braking sprockets 54, but it is preferable to change the operating mechanism of these brakes so that they can be individually operated from the cab of the truck. Similarly, it is preferable that brakes 43 of the idler wheels can be individually operated from the truck cab.

A pair of endless track belts 60 extend around wheels 37 idler wheels 42 and sprockets 54, as clearly shown in FIG. 5. These belts are such that they are constrained against lateral movement by the wheels and sprockets, and are driven by sprockets 54. These belts can be of any desired width and of any desired construction.

An example of a track belt 60 is illustrated in FIG. 7. This belt comprises a pair of spaced flexible belt elements 64 interconnected by transversed grouser bars 65 which extend across their outer surfaces and are secured thereto by bolts 66. The spaced apart belt elements form a slot 68 therebetween, and a plurality of closely spaced bars 69 extend across the inner surfaces of belt elements 64 and are secured thereto by bolts 70. Each bar 69 has a U-shaped central section 71 which extends across and fits down into belt slot 68. The central sections of bars 69 combine to form a channel 72 in which wheels 37 and 42 and sprockets 54 ride. The teeth of these sprockets grip the bar central sections 71 to drive the track belts around the wheels. Each bar 69 has thereon an upwardly-extending lug 75 on each of the opposite sides of channel 72 to help prevent the track belts from shifting laterally on the wheels.

FIG. 8 illustrates an alternative conversion unit 11b which is the same as unit 11, excepting that the truck transmission 46 is left connected to the drive shaft 50 of the truck, and sprockets 80 driven by the rear end unit are connected by chains 81 to another pair of sprockets 82 mounted on the ends of stub shafts 83 suitably supported on unit frame 20. The stub shafts carry a pair of drive sprockets 86 which are positioned to engage and drive track belts 60. It is preferable to make sprockets 82 larger than sprockets 80 so that a speed reduction is attained through this chain and sprocket extension drive. If desired, individually operated brakes 88 are provided for shafts 83.

Standard truck 10 is converted to a tracked vehicle merely by removing its rear wheels and rear end assembly, connecting unit frame 20 to the truck frame 28, mounting rear end assembly 46 on to the unit frame, and connecting the latter through shaft extension 49 to the truck shaft 50. When sprockets 54 are mounted in place, track belts 60 can be driven by the truck motor. Brakes 43 and 55 do not have to be individually operated, in which case they merely act as brakes for the vehicle, but if they are individually operated, one track belt can be braked while the other is driven in order to help steer the vehicle. In this case, it is necessary to provide individual controls for the brakes 43, 55 on each side of the conversion unit. Control units of this type are well known in the industry.

Conversion unit 11b operates in the same manner as unit 11 excepting that there is a speed reduction attained through the drive extension provided by sprockets 80 and 82 and chains 81.

As previously stated, conversion unit 11a of FIG. 3 is the same as unit 11, excepting that it is longer, in which case it has more load-carrying wheels 37.

This invention makes it possible to produce a tracked vehicle without the very high costs that are involved with the tracked vehicles that are specially made for a purpose. In the latter, the entire framework, power drive, transmissions and controls have to be specially developed for them. In the present case, it is only necessary to remove the back wheels of a standard truck, and to shift the rear end assembly thereof for use in the drive of the tracked vehicle. If desired, special rear end assemblies can be used in these units. Thus, the main portions of the finished tracked vehicles have been produced by the ordinary mass-production methods, and the only increased cost resides in the cost of the conversion unit and the time and effort necessary for the conversion itself. A very great advantage of the present invention lies in the fact that a person can have a truck for normal usage, and can quickly convert it to a tracked vehicle for use off highways, through swampy or bad terrain, and over snow. When the tracked vehicle is no longer required, the truck can be converted back for normal usage.

I claim:

1. A traction unit for converting a standard truck to a tracked vehicle and utilizing the drive axle assembly of said truck, comprising
   a frame member for supporting engagement beneath the truck chassis,
   means for detachably clamping the frame member rigidly to the chassis,
   a plurality of load bearing wheels journalled on bearing axles carried by the frame on each side thereof,
   means for mounting the drive axle assembly of said truck on said frame member,
   drive sprocket wheels for driving connection to the axles of said axle assembly and in alignment with the load bearing wheels on opposite sides of the frame member, and
   a pair of endless track belts for engagement, one on each side of said frame, around said load bearing and sprocket wheels.

2. A traction unit as claimed in claim 1, including driving means for driving said sprocket wheels through said assembly.

3. A traction unit as claimed in claim 2, wherein said driving means comprises a drive shaft extending from the vehicle transmission to said assembly.

4. A traction unit as claimed in claim 3 wherein said driving means comprises sprocket and chain drives drivingly connectable between the axles of said assembly and the sprocket wheels.

5. A traction unit as claimed in claim 1, wherein the load bearing wheels are resiliently suspended from the frame.

6. A traction unit as claimed in claim 1 in which said track belts have endless sprocket wheel engaging means mounted thereon.

7. A traction unit as claimed in claim 1, in which said frame unit is only long enough to support the rear portion of said standard vehicle.

8. A traction unit as claimed in claim 1, in which said frame unit is long enough to support all of said standard vehicle.

9. A traction unit as claimed in claim 1, in which said drive means includes control means for selectively driving each of said track belts independently of the other of said belts.

10. A traction unit as claimed in claim 1, in which said drive means includes control means for driving each of said track belts independently of the other of said belts, and brake means for selectively braking each of the track belts.

* * * * *